United States Patent
Bliss et al.

(10) Patent No.: US 7,860,589 B2
(45) Date of Patent: Dec. 28, 2010

(54) PROGRAMMATIC ACCESS TO CONTROLLER CONSTRUCT AND VARIABLE NAMES

(75) Inventors: Ronald E. Bliss, Twinsburg, OH (US); Jeffery W. Brooks, Mentor on the Lake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 115 days.

(21) Appl. No.: 11/534,259

(22) Filed: Sep. 22, 2006

(65) Prior Publication Data

US 2007/0208440 A1   Sep. 6, 2007

Related U.S. Application Data

(60) Provisional application No. 60/778,720, filed on Mar. 2, 2006.

(51) Int. Cl.
G05B 19/42 (2006.01)
G05B 11/01 (2006.01)

(52) U.S. Cl. ......................................... 700/86; 700/19

(58) Field of Classification Search .................. 700/19, 700/86
See application file for complete search history.

(56) References Cited

U.S. PATENT DOCUMENTS

| | | | |
|---|---|---|---|
| 5,285,376 A | 2/1994 | Struger et al. | |
| 5,923,903 A | 7/1999 | Alvarez-Escurra et al. | |
| 6,198,480 B1 * | 3/2001 | Cotugno et al. | 715/866 |
| 6,385,496 B1 * | 5/2002 | Irwin et al. | 700/87 |
| 7,424,328 B2 * | 9/2008 | De Silvio | 700/18 |
| 2005/0085928 A1 | 4/2005 | Shani | |
| 2005/0203648 A1 * | 9/2005 | Martin | 700/87 |

OTHER PUBLICATIONS

Office Action mailed Sep. 26, 2008 for Chinese Patent Application Serial No. 200710103537.0, 4 pages.
Office Action mailed Jan. 28, 2008 for European Patent Application Serial No. 07004365.8, 1 page.
Office Action mailed Jul. 13, 2007 for European Patent Application Serial No. 07004365.8, 7 pages.

* cited by examiner

Primary Examiner—Ryan A Jarrett
(74) Attorney, Agent, or Firm—Turocy & Watson LLP; R. Scott Speroff; John M. Miller

(57) ABSTRACT

The claimed subject matter provides a system and/or method for employment in an industrial automation environment that facilitates utilizing data within a programmable logic controller. An interface component can facilitate receipt of a portion of data related to a programmable logic controller. An access component integrated within a programmable logic controller (PLC) and communicatively coupled to the interface component can employ programmatic access to the name and respective data space during runtime.

28 Claims, 11 Drawing Sheets

PROGRAMMATIC ACCESS TO CONTROLLER CONSTRUCT AND VARIABLE NAMES

CROSS REFERENCE TO RELATED APPLICATION(S)

This application claims the benefit of U.S. Provisional Patent Application Ser. No. 60/778,720 filed on Mar. 2, 2006, entitled "PROGRAMMATIC ACCESS TO CONTROLLER CONSTRUCT AND VARIABLE NAMES." The entirety of which application is incorporated herein by reference.

TECHNICAL FIELD

The subject invention relates to industrial control systems and, more particularly, to optimizing retrieval and/or usage of data from a programmable logic controller.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

As can be noted from the above, data associated with conventional industrial controllers is created, delivered, and/or stored with a flat physical address space. In other words, all that can be discerned by reviewing data received and/or output by a controller is the memory location where the data for an actuator or sensor and a status resides. This industrial controller architecture operates efficiently for real-time control of a particular device—however, problems can arise when data from industrial controllers is desired for use by a disparate system, user, programmer, device, application, etc. For example, if data from the controller was desired for use by a scheduling application, individual(s) familiar with the controller must determine which data is desirable, cross-reference the data's memory location, export the memory contents, and then extract the necessary data accordingly. The problem is compounded if several applications wish to utilize similar data and/or if the names and/or memory locations associated with the controller data changes.

In particular, data variables, memory locations, names, etc. can be stored off-line in, for example, a project file. In order for other devices, systems, applications, etc. to take advantage of such information, the programmer must export information to a file (e.g., text file) and then extract the desired names from the file (e.g., utilizing a software tool and/or manual extraction). Such task can be daunting, meticulous, and inefficient, yet if the memory locations or names for the data change, the task would need to be repeated to re-associate the system software with the data.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate programmatically accessing a reference and/or name associated with at least one of a controller, a component related to the controller, a modular controller component, etc., within a programmable logic controller such that the name and/or reference string can be utilized by various parts throughout the control system. An access component can receive data via an interface component, wherein a name can be distributed from a programmable logic controller. The name can be associated with at least one of a task, a program, a routine, a controller, a component, a portion of code utilized by a controller, a module, an I/O module, a network, a drive, a motion axis, a drive, a trend, a structure, a tag, an object, a modular controller component, and/or any suitable entity that can be utilized within an automation environment that includes a reference and/or a name stored in the PLC 104. The access component can provide programmatic access to the name and respective data space during runtime which can allow data corresponding to a particular name to be re-used based on the name referencing such space and data. In addition, such re-use can be automatically tailored to a disparate name while maintaining the core functionality of the data space. It is to be noted that a PLC can be a dedicated piece of hardware that is self contained or in the case of a "soft PLC" a piece of software that runs on a computer and provides PLC-like control. For instance, in the case of a soft PLC, code can be extracted by the soft PLC were to access the project database directly to extract the name information.

In order to obtain the name string, the access component can indirectly specify the type of entity (e.g., component, portion of data, etc.) of interest using execution context information, or directly specify the specific item to be obtained.

The benefit of the indirect approach is that a generic specifier ("This") can be used so that the programmer can develop generic code that is abstracted from the actual controller structure. When the program is executed, the name string is then retrieved to provide inheritance.

In accordance with another aspect of the innovation described herein, the access component can utilize a security component that provides security at a granular level and/or global manner for the name. In particular, the security component can define security, authorization, and/or privileges in accordance with the names, wherein sectors and/or portions of the data can be associated to a specific security level. The access component can further utilize at least one of a log component (e.g., that tracks at least one name), a search component (e.g., that provides querying of data within the industrial automation environment), and a bridge component (e.g., that provides network capability. In other aspects of the claimed subject matter, methods are provided that facilitate programmatically accessing a name and respective data space within a programmable logic controller during runtime.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
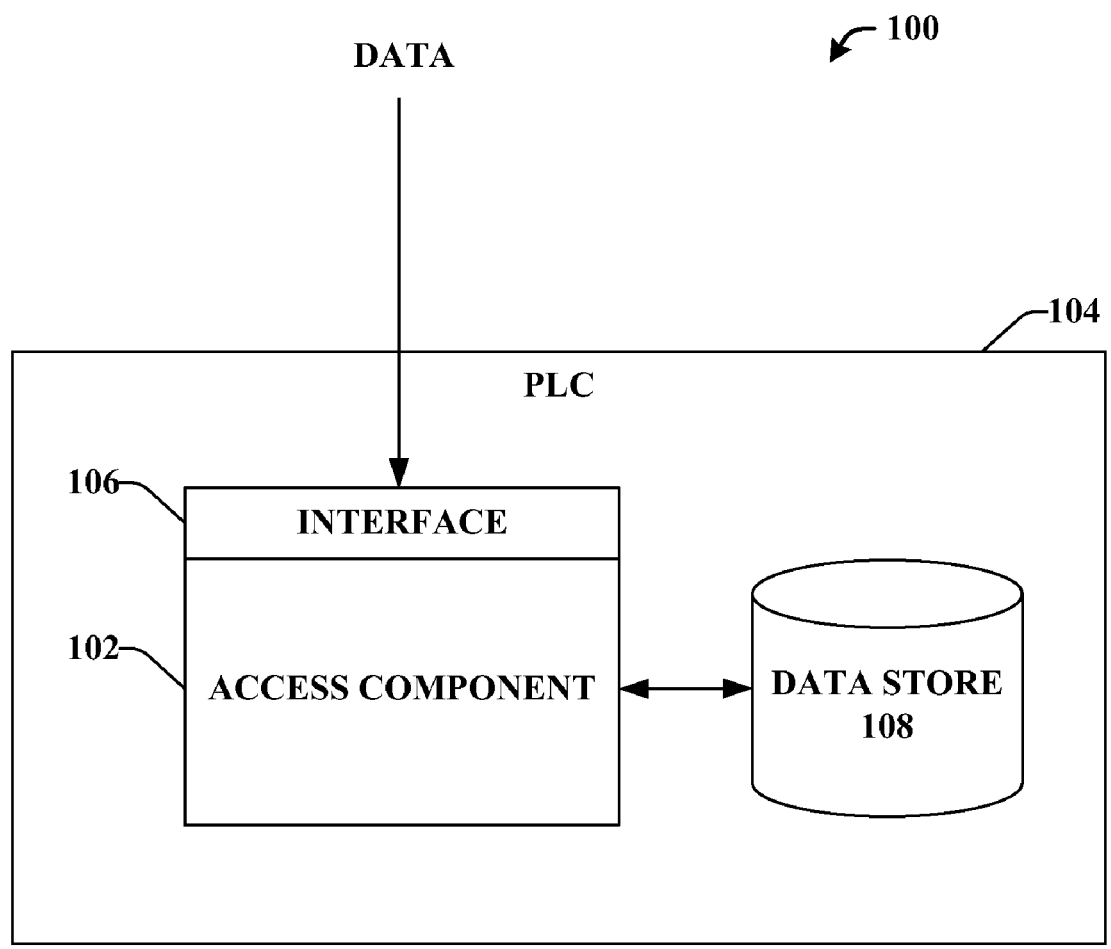
FIG. 1 illustrates a block diagram of an exemplary system that facilitates optimizing programming capabilities associated with a name within a programmable logic controller.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates optimizing programming capabilities associated with names within a programmable logic controller. The system 100 can include an access component 102 that can receive data via an interface component 106 (discussed infra and herein referred to as "interface"), wherein a name can be distributed from a programmable logic controller 104 (herein referred to as the "PLC"). The name can be associated with at least one of a task (e.g., executable fragments, etc.), a program (e.g., buckets of code, etc.), a routine (e.g. chunk of code, etc.), a controller, a component, a portion of code utilized by a controller, a module, an I/O module, a network, a drive, a motion axis, a drive, a trend, a structure, a tag, an object, a modular controller component, a device, and/or any suitable entity that can be utilized within an automation environment that includes a reference and/or a name stored in the PLC 104. Moreover, the access component 102 can provide programmatic access to the name and respective data space during runtime. In other words, the access component 102 can allow data space (e.g., and associated data) to be re-used based on the name referencing such space and data, wherein the re-use can be automatically tailored to a disparate name while still utilizing the core functionality of the data space. Furthermore, the access component 102 can allow inheritance of names/data space/functionality, enhanced encapsulation, and can dramatically improve productivity to access portions of data and re-using such data. It is to be noted that a PLC can be a dedicated piece of hardware that is self contained or in the case of a "soft PLC" a piece of software that runs on a computer and provides PLC-like control. For instance, in the case of a soft PLC, code can be extracted by the soft PLC were to access the project database directly to extract the name information.

The data received by the interface 106 can relate to any data utilized by the PLC 104 and/or an automation environment. With respect to the PLC 104, data can take the form of individual bits that represent an on or off state, numeric values in the form of integers and/or floating point, text strings stored as individual characters (e.g., represented by ASCII codes, etc.). The access component 102 can receive such data and allow the exposure of any name (and corresponding data space) to allow re-use within an automation environment and/or data space based on such received data. Data associated with the PLC 104 can be structured into components and/or portions, wherein each partition and/or section can include a name. The access component 102 can allow a portion of data within a data space (reference by a name) to be utilized in a disparate data space with a disparate name yet still maintaining the core functionality of such data. For example, code related to a spray device 1 can be used by the 10 spay devices within a plant only differing by referencing the specific spray device (e.g., spray device 2, spray device 3, etc.). Each spray device can utilize the same code and/or data to run such device with a PLC, yet programming this can be meticulous and repetitive because in addition to duplicating the code fragment such as a routine and renaming the routine, the contents of the code would also require modification to associate data to each specific spray device instance. Yet, the access component 102 can allow the data/code related to spray device 1 to be automatically implemented for other spray devices. In one example, such automatic implementation can be made by extracting the name from the controller's memory and placing said name into a data area where it can be manipulated and extend to create instance specific data strings. Therefore, programming the spray devices is greatly simplified by allowing the code/data related to spray device 1 to be re-used for all spray devices while automatically updating names (e.g., replacing spray device 1 with the appropriate spray device name) and inheriting any other data related thereto.

For example, an instruction that can be an existing instruction or a new instruction that is part of the controller project and is scanned by the PLC at runtime to request the access component 102 to provide a name from the PLC 104. In other words, the request and/or data received can leverage names utilized in the PLC 104 to enable program and data re-use. Therefore, names of controller components can be used as application data by the PLC 104 as the basis for control decisions and/or to create/augment data (e.g., ASCII text string data) that can be sent to another system component/device (e.g., for display on a Human Machine Interface (HMI) not shown). The benefit of the example associated with ASCII text string data is that the text associated with these names can be re-used without having to manually type and/or recode for code and/or applications. Thus, the access component 102 provides efficiency and enhances programming in association with utilizing a name and respective data space associated with the PLC 104.

The access component 102 further provides the name to relate to an automation device, a user, an application, and/or a portion of code. The name and respective data space can be, for example, manipulated to replace the name (pre-existing within the system 100) with a disparate name (newly established) yet still include the data and functionality associated with the data space which allows such disparate name, data space, and respective data to be re-used by automation devices, applications, users, systems, and/or throughout the system 100. Moreover, the system 100 can reduce the need to manually extract names from a project file, application, routine, task, program, etc. or create tools to process exported name files and/or reference files. The system 100 can allow other devices to implement programmatic access of the desired information directly from the PLC 104 during runtime with minimal effort (e.g., allowing a program and/or portion of code to access such names and respective data space). Additionally, as code is re-used, the name and respective data space can automatically inherit the names (and functionality) from the program structure rather than having to perform search and replace operations as discussed above.

It is to be appreciated that the device (also referred to as the automation device) can be, but is not limited to, a human machine interface (HMI), a computer, a disparate controller, a roller, a station, a welder, a scanner, a belt conveyor, a pusher, a pump, a press, a fan, a photo eye, etc., or any other suitable device utilized in automation systems. Furthermore, the automation device can be controlled by the PLC 104. It is to be appreciated that the PLC 104 can contain software components and hardware components having inputs and/or outputs that can be utilized in connection with automating an industrial manufacturing device/process. In addition, it is to be understood that the access component 102 can enhance programmability for a plurality of PLC's, and for the sake of brevity throughout the subject innovation, a single PLC 104 is depicted but the claimed subject matter is not so limited.

Moreover, the PLC 104 can include an internal data store 108 that can store names related to any suitable entity that can be utilized within an automation environment such as, but not limited to, a task (e.g., executable fragments, etc.), a program (e.g., buckets of code, etc.), a routine (e.g. chunk of code, etc.), a controller, a component, a portion of code utilized by a controller, a module, an I/O module, a network, a drive, a motion axis, a drive, a trend, a structure, a tag, an object, and a modular controller component.

The data store 108 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 108 of the subject systems and methods is intended to comprise, without being limited to, these and any other suitable types of memory. In addition, it is to be appreciated that the data store 108 can be a server, a database, a hard drive, and the like.

Moreover, the system 100 can include any suitable and/or necessary interface component 106, which provides various adapters, connectors, channels, communication paths, etc. to integrate the access component 102 into virtually any operating and/or database system(s). In addition, the interface component 106 can provide various adapters, connectors, channels, communication paths, etc., that provide for interaction with the access component 102.

Figure 2:
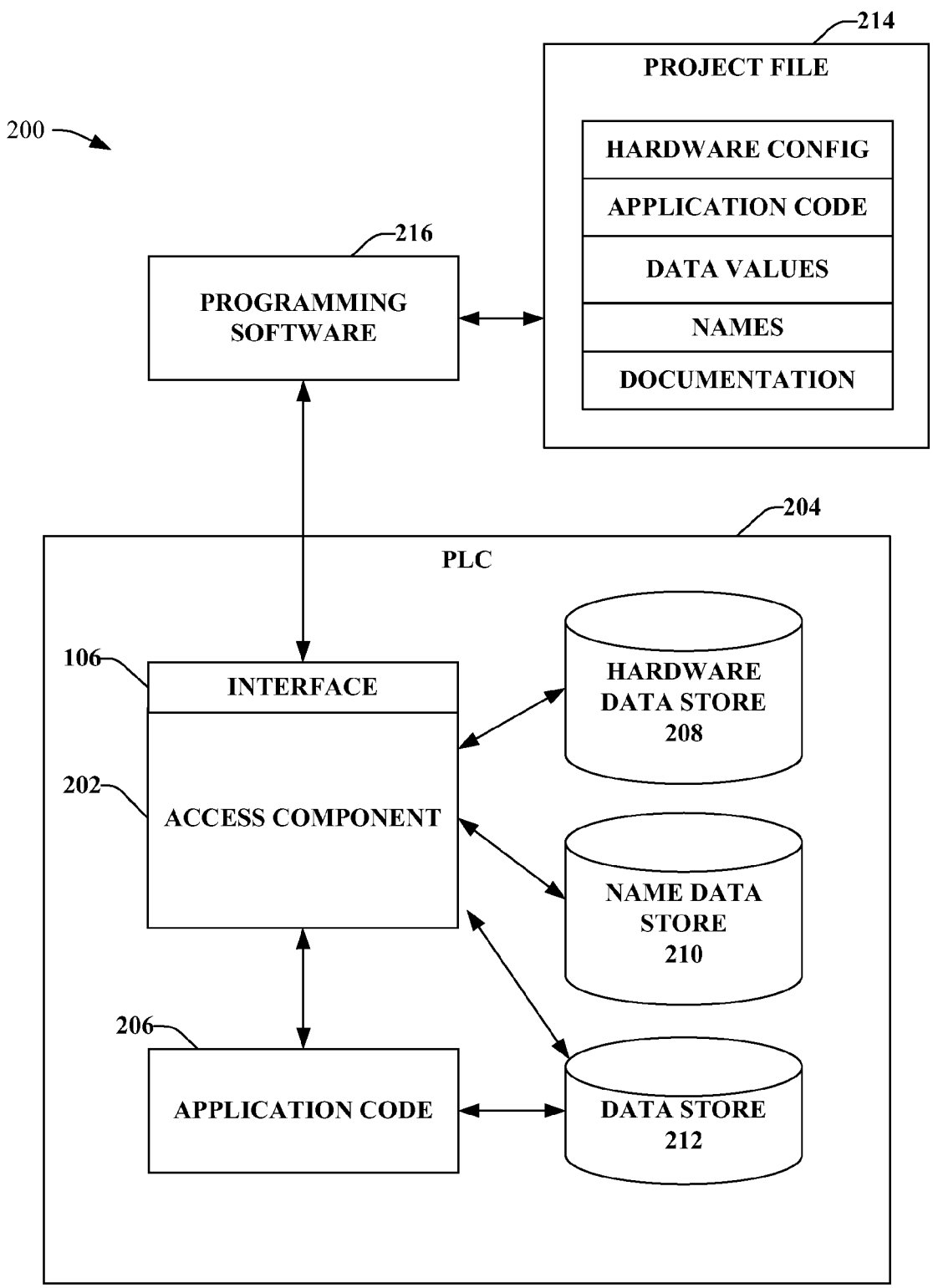
FIG. 2 illustrates a block diagram of an exemplary system that facilitates employing programmatic access to a PLC during runtime.

FIG. 2 illustrates a system 200 that facilitates employing programmatic access to a PLC during runtime. The system 200 can include a PLC 204 with an incorporated access component 202 that can provide programmatic access to a name and a respective data space. The PLC 204 can further include a plurality of data stores, wherein a first data 208 store can store hardware configuration (e.g., also referred to as hardware data store), a second data store 210 can provide name storage (e.g., also referred to as name data store), and a third data store 212 can provide data storage. A project file 214 that can include, but is not limited to, a hardware configuration, application code, data values, names, documentation, etc. The names, code, and data can all originate via the project file 214 that can be loaded into the PLC 204. It is to be appreciated that programming software 216 can utilize at least one of the project file 214 and/or the PLC 204. Furthermore, the code in the PLC 204 can utilize the access component 202 to read the name and load it into the data store 212 that provides data storage. In other words, the access component 202 can provide programmatic access to the name data storage 210 during runtime. Once the names are in the data store 212, they can be utilized by application code 206 to base at least one of a control decision, create message text strings, be read by an HMI for use on displays, etc.

Figure 3:
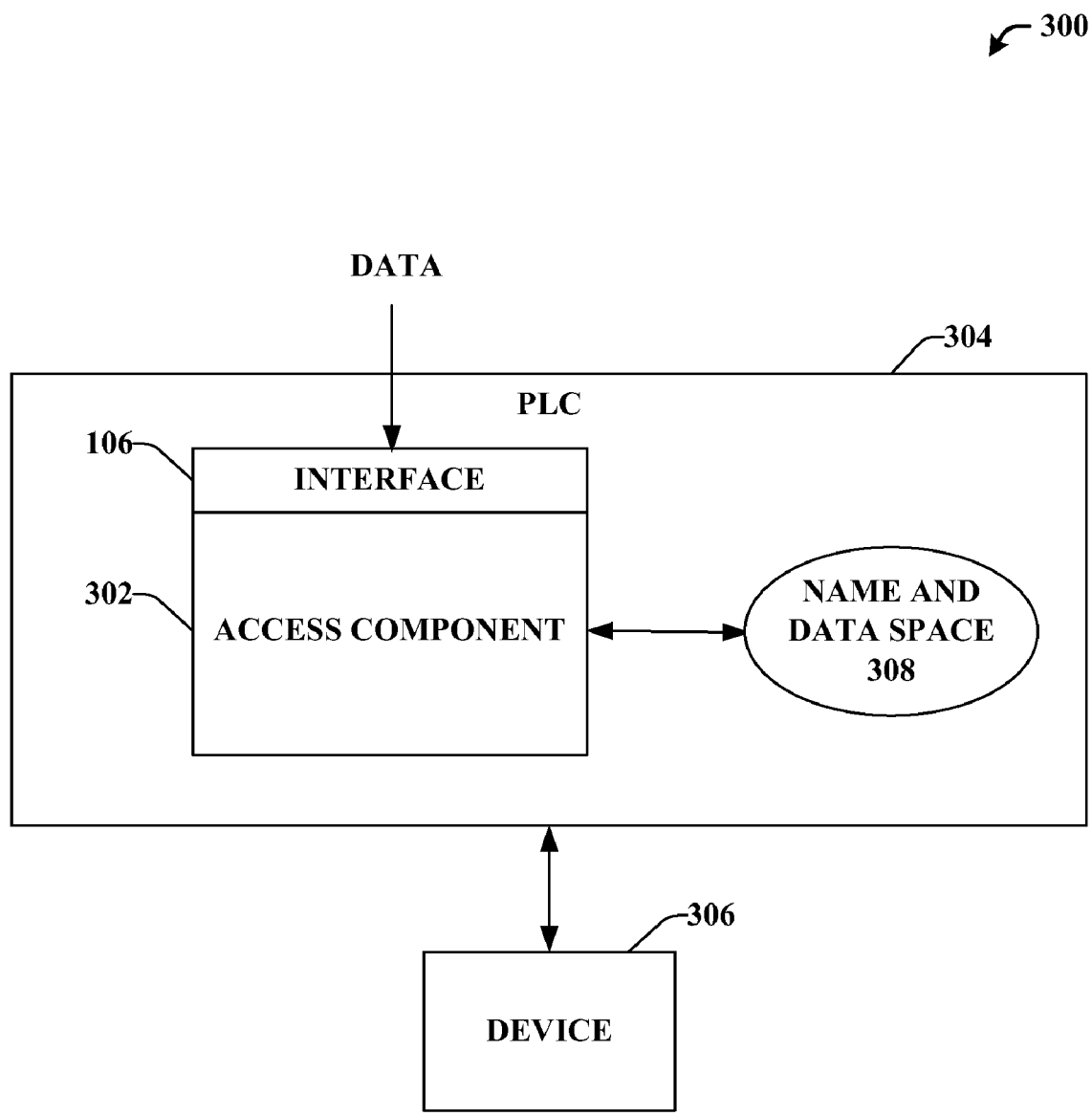
FIG. 3 illustrates a block diagram of an exemplary system that facilitates programmatically accessing a name within a programmable logic controller to implement data associated therewith throughout an environment.

FIG. 3 illustrates a system 300 that facilitates programmatically accessing a name within a programmable logic controller to implement data associated therewith throughout an environment. The system 300 can include an access component 302 that can provide programmatic access to a name and data space 308 within the PLC 304 during runtime. The access component 302 can receive data at runtime via the interface 106 such that the name and data space 308 can be programmatically accessed and utilized for disparate portions of data (having disparate reference names) based on the data received. With respect to the PLC 304, data can take the form of individual bits that represent an on or off state, numeric values in the form of integers and/or floating point, text strings stored as individual characters (e.g., represented by ASCII codes, etc.). The name and data space 308 can be any entity with a name utilized by the PLC 304, an automation environment, and the like. For example, the name and data space 308 can relate to a task (e.g., executable fragments, etc.), a program (e.g., buckets of code, etc.), a routine (e.g. chunk of code, etc.), a controller, a component, a portion of code utilized by a controller, a module, an I/O module, a network, a drive, a motion axis, a drive, a trend, a structure, a tag, an object, and a modular controller component. It is to be appreciated that the access component 302 and the PLC 304 of FIG. 3 can be substantially similar to the access component 102 and the PLC 104 as depicted in FIG. 1.

In an example, a data space can provide functionality associated with text strings in a human machine interface (HMI), wherein the name (e.g., pusher device 1) relates to a device (e.g., pusher 1). Within the automation environment, there can be any suitable number of pusher devices. For each pusher device, there will typically involve numerous text strings for the HMI to display messages, wherein each message can be substantially similar except for the specific pusher device the message relates. Thus, for a "jam fault" on pusher device 1, the message can say "Jam fault on pusher 1." This message can be displayed for all pusher devices in such a situation. Conventionally, programming such text string in the HMI can be a meticulous and redundant task involving numerous copying, pasting, searching, and replacing. However, the access component 302 allows the data space associated with pusher device 1 to be programmatically accessed and can automatically implement the data associated therewith by replacing the name pusher device 1 with the disparate name desired (e.g., pusher device 2, pusher device 3, pusher device 4, etc.). In other words, the access component 302 can provide programmatic access to a name within the PLC 304, wherein the access exposes the name and data space associated therewith to allow data within the data space to be utilized with a disparate name while maintaining the functionality of such data space and data.

The name and data space 308 can be existent for a first entity within the PLC 304. However, a user can program a disparate portion of data by re-using the name and data space 308 from the first entity for a second entity (non-existent within the PLC 304). Therefore, the user can utilize the access component 302 to employ programmatic access to the name and data space 308 during runtime to allow such data associated with the first entity to be implemented for the second entity in the substantially similar manner other than having a disparate name and respective data space. In other words, the programmatic access of the name and data space 308 within the PLC 304 during runtime can allow portions of data to be automatically tailored for a specific entity and implemented providing functionality without repetitive code techniques such as copying, pasting, searching, replacing, etc.

Based on such programmatic access provided by the access component 302, the name and data space 308 can be utilized by the PLC 304 and a device 306 related thereto. It is to be appreciated that the device 306 (also referred to as the automation device) can be, but is not limited to, a human machine interface (HMI), a computer, a disparate controller, a roller, a station, a welder, a scanner, a belt conveyor, a pump, a press, a fan, a photo eye, etc., or any other suitable device utilized in automation systems. In other words, the name and data space 308 can be stored within the PLC 304, accessed via data received by the access component 302, re-used and implemented at runtime, and utilized by the PLC 304 and/or the device 306.

Figure 4:
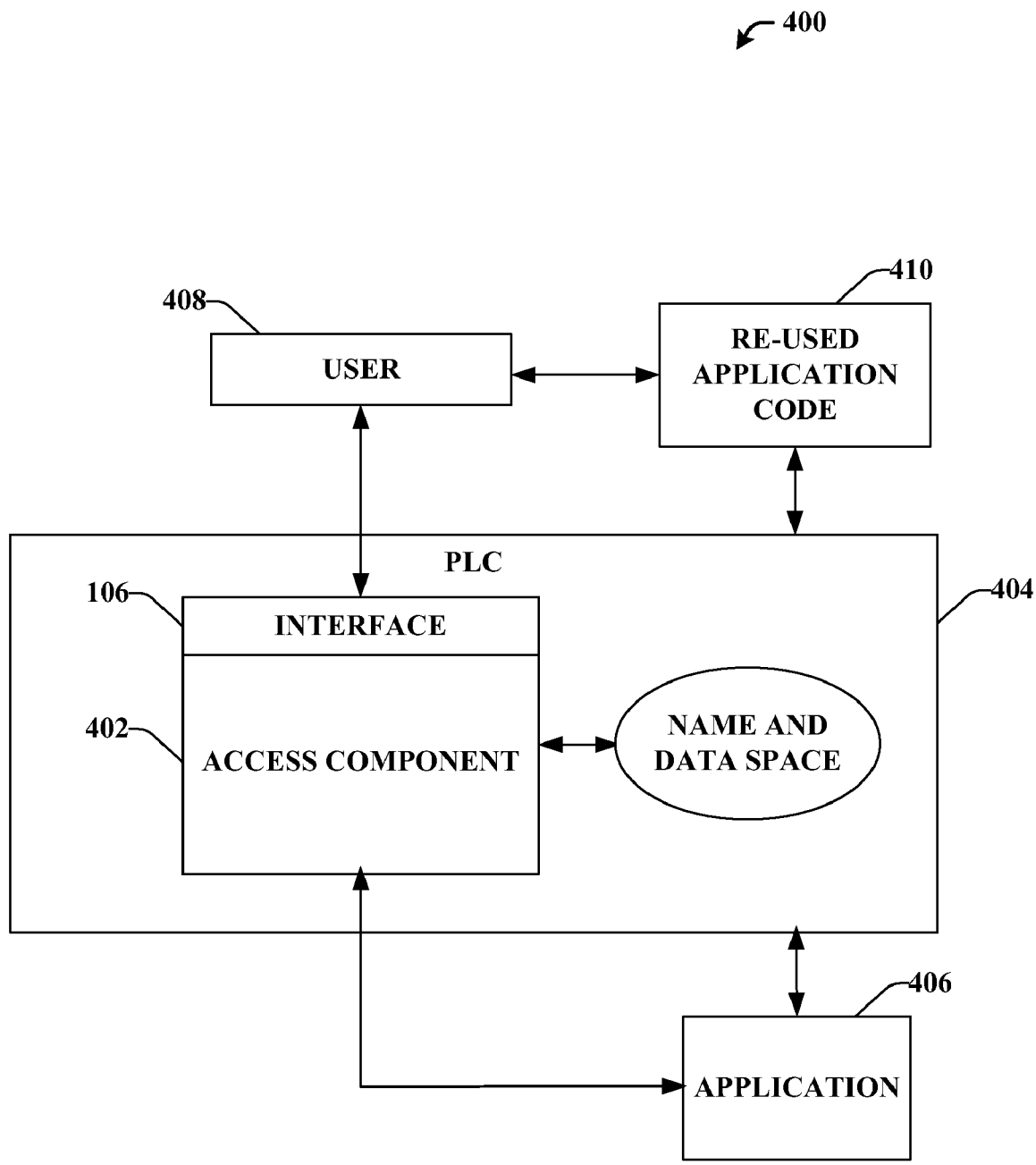
FIG. 4 illustrates a block diagram of an exemplary system that facilitates providing inheritance for a particular name utilized within an industrial control environment.

FIG. 4 illustrates a system 400 that facilitates providing inheritance for a particular name utilized within an industrial control environment. The system 400 can include an internal access component 402 within a PLC 404 that facilitates programmatic accessibility to internally stored names and respective data spaces. The access component 402 can receive a request from a user 408 to retrieve a name and respective data space stored within the PLC 404. Such retrieved name and data space can be replicated to facilitate programming within an industrial automation environment based on substantially similar portions of data associated therewith. The replicated data can also inherit characteristics associated with the name and respective space. The replicated data can be referenced by a user-defined name (disparate in comparison to the retrieved name). Thus, a user may want to program four roller devices (named roller1, roller2, roller3, and roller4) based on a portion of data that controls such devices, wherein the portion of data can be named "roller1."

The user can retrieve data related to "roller1" and replicate such data to program the disparate rollers at runtime by utilizing "roller1" data but automatically replacing such name with the respective names "roller 2," "roller3," and "roller4" throughout the entire portion of data employed. By allowing such programmatic access at runtime within the PLC 404, programming for a plurality of entities within the system 400 that utilize the substantially similar data can be optimized based on this re-use and automatic population/replacement of the appropriate names.

In another example, the user can utilize any suitable request and/or instruction such as, but not limited to, a "Get System Value" (GSV) or a new instruction at runtime. Upon receipt of such instruction, the access component 402 can retrieve the name and copy it into a user created variable such as a string tag. Once the data is available in the string tag, the existing string manipulation instructions can be utilized to merge the name string with disparate characters to provide meaningful messages that can communicate with an application 406. Similarly, the name string can be read directly from the PLC 404 by an external device (not shown) for its own use.

For example, the user 408 can process a request to provide various names related to the PLC 404, program files, project files, applications, project structure, etc. Once the user 408 receives such data, it can be re-used to create application code (referred to as re-used application code 410). This application code when instantiated can be assigned a name based, for instance, by the user 408. The code within the application can reference data within an isolated data space. This data may contain data message strings that were created when the code was initially created. The code, by way of the aforementioned instruction, can leverage the access component 402 at runtime to automatically modify the data message strings to include the name assigned by the user 408. The result is the code is able utilize the new name without having to manually re-enter names into data variable. Thus, the system 400 vastly improves the efficiency involved with programming for the PLC 404 by leveraging the names utilized to define the project structure utilized by the PLC 404. Conventionally, users developing programmable controller application code could not leverage such data (e.g., project structure, variable name, user-defined variables, variable reference, etc.) within the PLC 404 for use in other portions of applications.

Specifically, having the ability to programmatically access the names related to any entity associated with the industrial environment and/or the PLC 404 (e.g., a task, a program, a routine, a controller, a component, a portion of code utilized by a controller, a module, an I/O module, a network, a drive, a motion axis, a drive, a trend, a structure, a tag, an object, a modular controller component, etc.) can be beneficial in creating strings of text that can be communicated to external devices. Moreover, the system 400 does not require the user 408 to create portions of code by re-entering names into string tags. Rather, the names can be stored in the PLC 404 and then provide instructions that can extract these strings when the project is running, an application 406 is able to leverage the names directly and avoid this re-entry. Additionally, this provides improved re-use of the application code because when the code is duplicated and re-named, the new copy can automatically inherit the name based on the new name(s) that are assigned. This can further avoid the dual entry and also the problems that can result if the second entry was missed.

Figure 5:
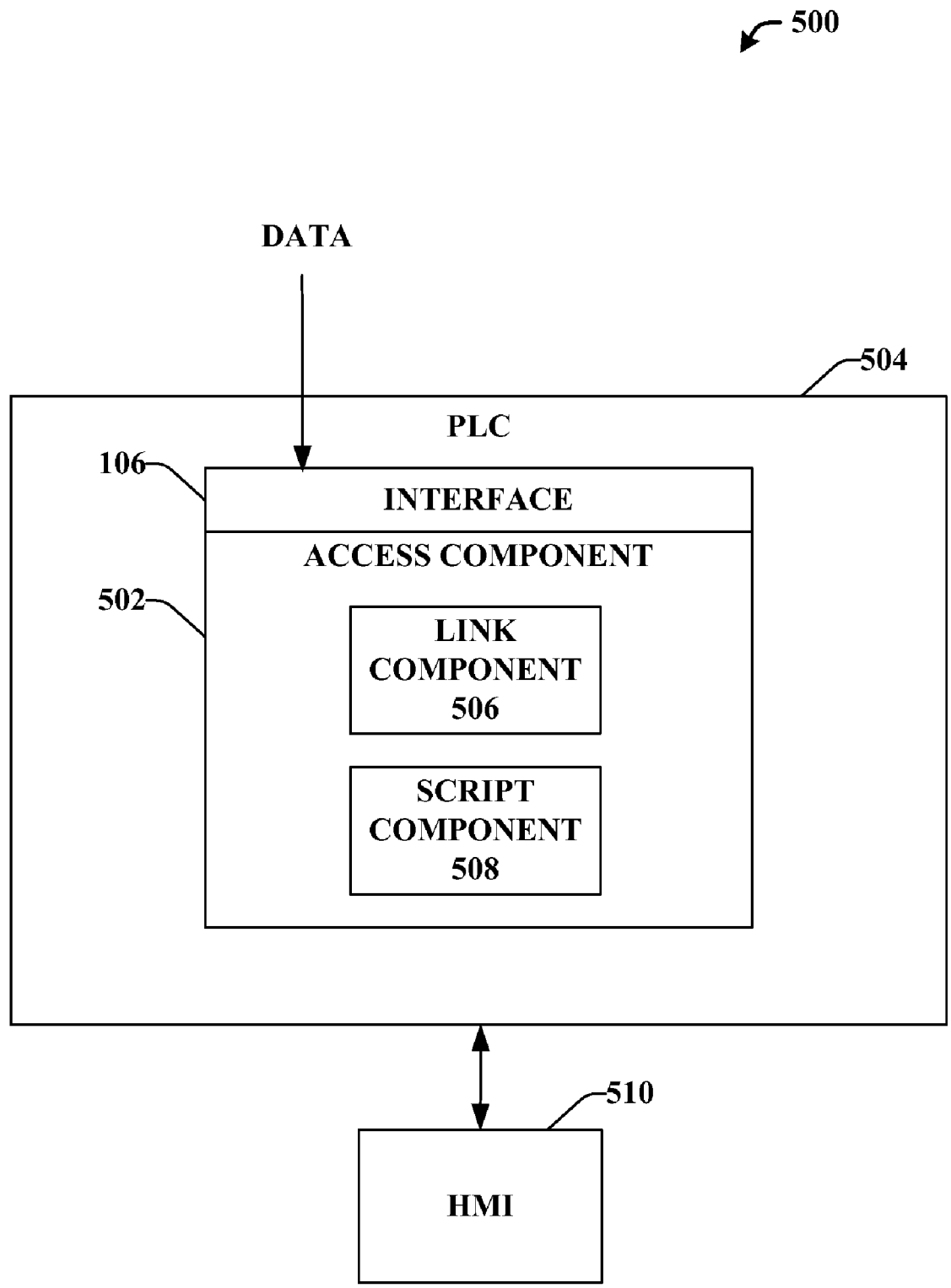
FIG. 5 illustrates a block diagram of an exemplary system that facilitates scripting a message including a name to be utilized with a human machine interface (HMI).

FIG. 5 illustrates a system 500 that facilitates scripting a message including a name to be utilized with a human machine interface (HMI). The system 500 can include an access component 502 incorporated within a PLC 504, wherein programmatic access for a name can be provided which allows such data related to such name to be re-used in applications, code, tasks, programs, routines, components, entities utilized by the PLC 504, entities utilized within an industrial automation environment, etc. The access component 502 can receive a request and/or an instruction via the interface 106, wherein the request and/or instruction can be initiated at runtime to retrieve the name and copy it into a user defined variable. For instance, the user defined variable can be a string tag. Once available in the string tag, existing string manipulation instructions can be utilized to merge the name string with other characters to provide meaningful messages that can be communicated to other devices. In addition, the name string can be read directly form the PLC 504 by an external device for its own use.

The access component 502 can include a link component 506. The system 500 can allow the ability to specify the current context by utilizing a generic "This" specifier that causes the instruction to grab the name and/or reference for a task, program, or routine where the instruction is executed. This allows for an indirect association to the desired name by requesting the type of object and/or controller component to be referenced and having the link component 506 return the name from the project structure based on the requesting location within the controller's code. This permits the ability to create generic code that is devoid of specific names and/or abstracted from a use of the code for a specific machine and/or application. Additionally, the link component 506 can utilize a specific named entity since it can link the instruction to a hidden identifier, wherein the instruction is able to stay linked to the name even if the name of the entity being retrieved is changed. In the case of variables or tags, the specific name of the tag can be specified, and like the program construct entity, the instruction is linked to the tag in such a way that it is able to maintain the link regardless of the changes to the name itself. It is to be appreciated that link component 506 can be a stand-alone component, incorporated into the access component 502, incorporated into the PLC 504, and/or any combination thereof.

The access component 502 can include a script component 508 that can provide message text associated with names utilized by, for instance, a human machine interface 510 (HMI). In other words, to optimize development and maintain a tight linkage between the PLC 504 and at least one character on the HMI 510, the access component 502 can extract the names utilized in the PLC 504, wherein the script component 508 utilized such names to build the message text. Specifically, the HMI 510 can receive names with respective data space, wherein the PLC 504 can get the name and automatically generate the name message. The script component 508 can provide any suitable messaging to the HMI 510 utilizing the names associated with any entity within the environment (e.g., a task, a program, a routine, a controller, a component, a portion of code utilized by a controller, a module, an I/O module, a network, a drive, a motion axis, a drive, a trend, a structure, a tag, an object, a modular controller component, etc.) such that the messaging can provide text and/or character for such HMI 510. It is to be appreciated that script component 508 can be a stand-alone component, incorporated into the access component 502, incorporated into the PLC 504, and/or any combination thereof.

The following is an example that can be implemented by the subject innovation and it is not to be limiting on the capabilities of the claimed subject matter. A company can utilize the system 500 to automate some development process(es). The company can create a project in the PLC 504, wherein the names for tasks, programs, routines, and Add-On Instructions (AOIs) can be carefully chosen based on the respective physical device(s). This can ensure that there is a tight linkage between the project names and descriptions and the labels that can be found on the device itself. For instance, there can be a device named "RD1_BRK_WLD1" for a bracket weld station. This name and/or reference can be the same name and/or reference used in the program name. The company can further have a "RD1_C5" as the name for a clamp and the name for the routine or in the further the name of the instance tag for an Add-On Instruction (AOI). Finally, there can be an alarm tag called "CLS_FLT." Additionally, there might be additional information such as limit switch ("RD1_C5_L1") and valve ("RD1_C5_V1") named used on input/output (I/O) point tags.

In order to optimize developments and maintain a tight linkage between the PLC 504 (including the respective project) and the HMI screen text, the company can extract the names utilized in the PLC 504, wherein the script component 508 can utilize them to build the message text. Conventionally, the company would have to create a special tool that extracts the message text formatting and the names for the devices from the various objects within the exported project. To find them, the company can create a sort of script in the rung comments that is used to tell a tool what to use for the resulting HMI message. The following can be pseudo code associated with what a script can look:

<@%0Clamp %1 Not Closed %2 %3>

In the above pseudo code, the numbers can translate into the following:

%0=Machine name which is the program where the rung comment was located

%1=Clamp name which is the routine where the rung comment text is located

%2=Switch name which is the name of a tag passed into the routine

%3=Valve output which is the name of a tag passes into/out from the routine

Based on the above, the resulting message would translate into the following:

"RD1_BRK_WLD1 Clamp RD1_C5 Not Closed RD1_C5_L1 RD1_C5_V1."

Conventionally, the user creating the program has to enter these names when creating the project code. Then, they have to go into the code, locate the rung comment for the alarm fault and then reenter the names a second time. An alternative to embedding the names in rung comments would be to create data text string variables in which to manually enter the appropriate names. The text variable data would then be accessed at runtime to generate the HMI message strings. In both cases however, the user has to program the names twice, these operation can be very error prone, which means during startup, they have to go through and validate every single message against the code to ensure the right text shows up on the HMI 510.

However, the system 500 mitigates the above-described problem by allowing the names within the PLC 504 to be programmatically accessed. Thus, the newly created names (user-defined) can be automatically integrated and/or merged with the existing data associated with the initial name (e.g., source). In other words, the user can implement data associated with the name as the source to be replicated (e.g., re-used, copied, etc.) to a destination by implementing the data in a substantially similar manner but for the replacement of the initial name (e.g., the source) with the user-defined name (e.g., the destination is the user-defined name not in existence and/or programmed).

Figure 6:
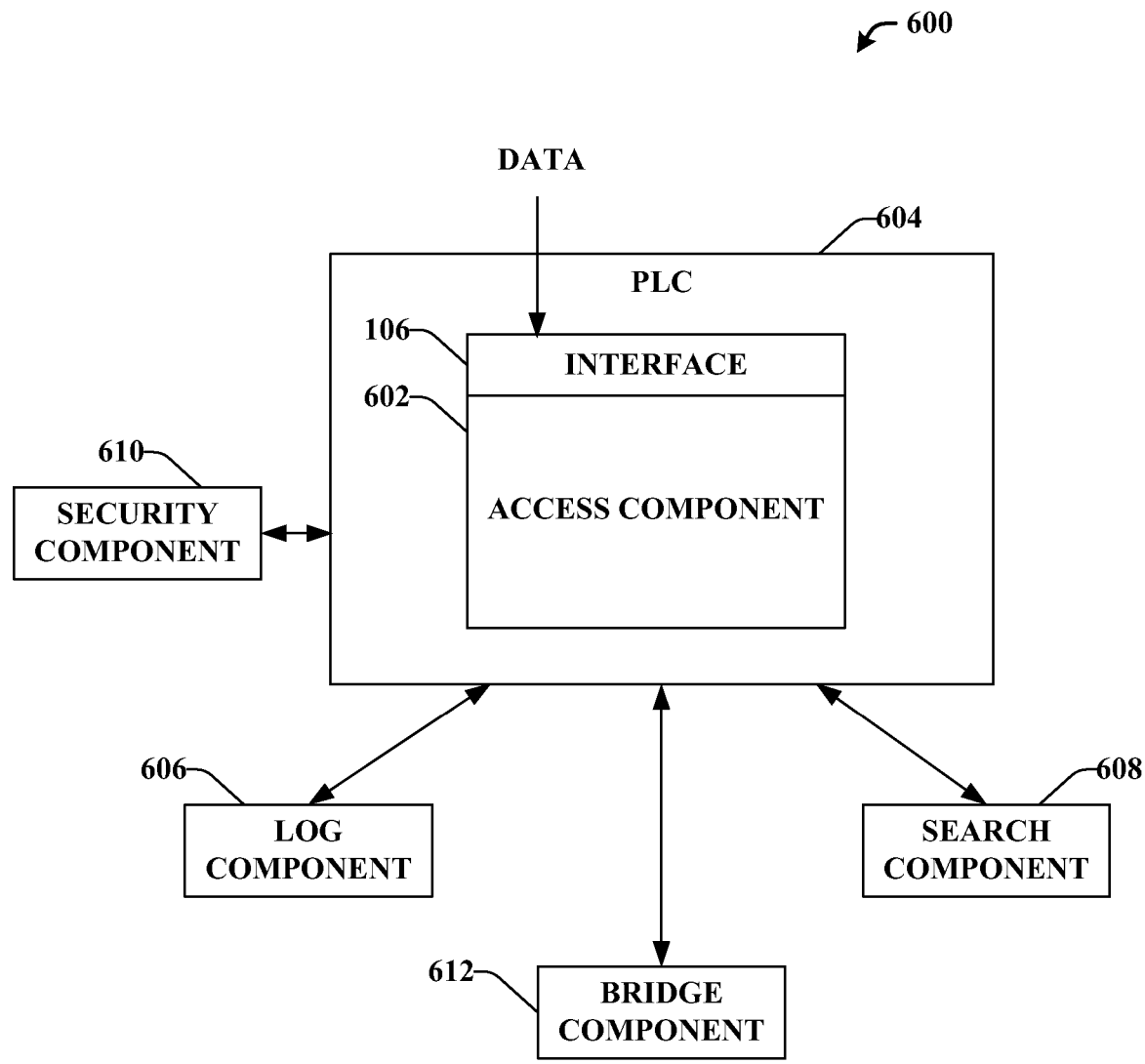
FIG. 6 illustrates a block diagram of an exemplary system that facilitates programming within an industrial automation environment by employing programmatic access to a name within a programmable logic controller.

FIG. 6 illustrates a system 600 that facilitates programming within an industrial automation environment by employing programmatic access to a name within a programmable logic controller. The system 600 can include an access component 602 that allows programmatic access to at least one name and respective data space within a PLC 604 at runtime, wherein the names can relate to a task (e.g., executable fragments, etc.), a program (e.g., buckets of code, etc.), a routine (e.g. chunk of code, etc.), a controller, a component, a portion of code utilized by a controller, a module, an I/O module, a network, a drive, a motion axis, a drive, a trend, a structure, a tag, an object, and a modular controller component. For instance, the access component 602 can receive data identifying a particular name and data space as a target, wherein the access component 602 can replicate data identified with the target for a destination (e.g., a user-defined variable). It is to be appreciated that the access component 602 and the PLC 604 can be substantially similar to the access component 402, 302, 202, and 102 and the PLC 404, 304, 204, and 104 as discussed above in FIG. 4, FIG. 3, FIG. 2, and FIG. 1 respectively.

The access component 602 can utilize a log component 606 that tracks variable names within the PLC 604. It is to be appreciated that the log component 606 can be a stand-alone component, incorporated into the access component 602, incorporated into the PLC 604, and/or any combination thereof. For example, if a user A utilizes the access component 602 to ascertain a variable name, the log component 606 can track the user (e.g., via IP address, network address, user name, computer name, etc.), the date and time, and the variable name accessed. The log component 606 can log various aspects related to receiving names such as, but not limited to, name changes, name updates, a task (e.g., executable fragments, etc.), a program (e.g., buckets of code, etc.), a routine (e.g. chunk of code, etc.), a controller, a component, a portion of code utilized by a controller, a module, an I/O module, a network, a drive, a motion axis, a drive, a trend, a structure, a tag, an object, a modular controller component, project files, edits to names, configuration settings, security settings, time stamps, dates, user names and/or computer names, etc. Moreover, the log component 606 can store the logged entries in a data store (not shown).

The access component 602 can further implement a search component 608 that facilitates querying any data associated with the system 600. The search component 608 allows a user and/or any component to query to system 600 in relation to code, names, variables, devices, references, user-defined variables, portions of code, portions of data, entities associated with the automation environment, entities associated with the PLC 604, tasks, routines, programs, project files, tags, etc. For instance, a user can query the system 600 utilizing the search component 608 to find a name of a device and/or data associated with a conveyor utilized by a particular PLC within the Localville, Ohio plant. In another example, the search component 608 can allow a developer to provide all names associated with devices within sector 5, cell 6, and controlled by controller A. It is to be appreciated that a plurality of searches and/or queries can be implemented by the search component 608 and the above examples are not to be limiting on the claimed subject matter. Moreover, it is to be appreciated that the search component 608 is depicted as a stand-alone component, but the search component 608 can be incorporated into the access component 602, incorporated into the PLC 604, a stand-alone component, and/or any combination thereof.

The access component 602 can further utilize a security component 610 that provides security to the system 600 to ensure data integrity and/or access. In particular, the security component 610 can define security, authorization, and/or privileges in accordance with at least one of a pre-defined hierarchy, security level, username, password, access rights, data importance (e.g., more important data correlates with high security clearance), etc. For instance, a particular name can be a first security level with distinct security authorizations and/or privileges, while a disparate name can have a second security level with disparate security authorizations and/or privileges. Thus, the security component 610 can provide granular security in relation to a name, a group of names, name location, name importance, entity relation, task relation, program relation, routine relation, device relation, project file relation, data relation within the project structure, etc. It is to be appreciated that there can be various levels of security with numerous characteristics associated with each level and that the subject innovation is not limited to the above example. Moreover, the security component 610 provides granular security and/or privileges to the system 600. It is to be appreciated that security component 610 can be a stand-alone component, incorporated into the access component 610, incorporated into the PLC 604, and/or any combination thereof.

The access component 602 can further include a bridge component 612 that facilitates networking within an industrial automation environment. In other words, the bridge component 612 can act as a network bridge. It is to be appreciated that the bridge component 612 can be a stand-alone component, incorporated into the access component 602, incorporated into the PLC 604, and/or any combination thereof. Thus, data carried by disparate networks can be manipulated so that it conforms to a common network. Accordingly, the bridge component 612 can recognize a network protocol associated with received instructions related to the PLC 604 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP).

Figure 7:
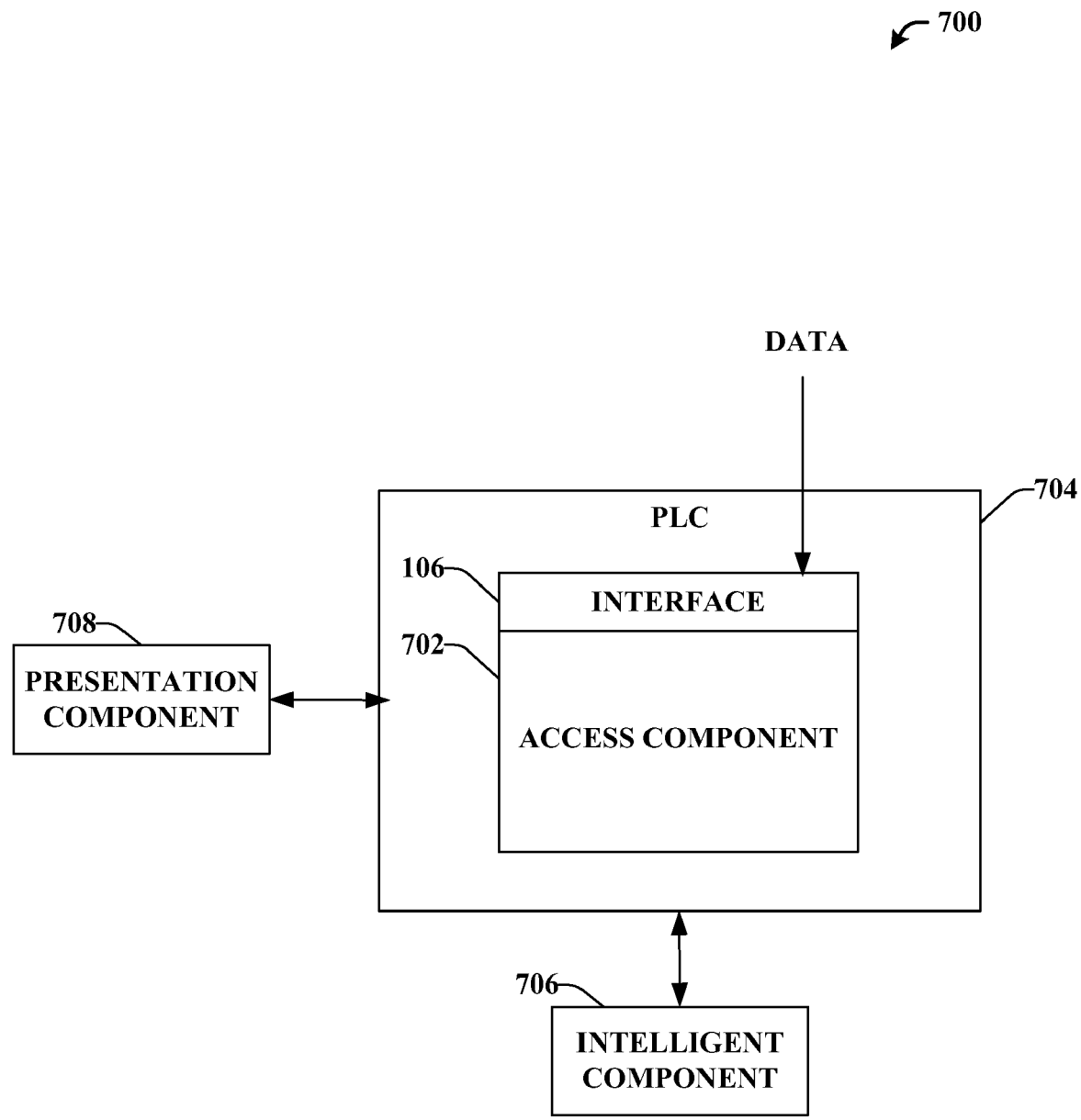
FIG. 7 illustrates a block diagram of an exemplary system that facilitates programmatically accessing a name within a programmable logic controller.

FIG. 7 illustrates a system 700 that employs intelligence to facilitate programmatically accessing a name within a programmable logic controller. The system 700 can include an access component 702, a PLC 704, and an interface 106 that can all be substantially similar to respective components, controllers, and interfaces described in previous figures. The system 700 further includes an intelligent component 706. The intelligent component 706 can be utilized by the access component 702 to facilitate programmatically accessing a name and respective data space within the PLC 704. For example, the intelligent component 706 can infer entity relation, task relation, program relation, routine relation, device relation, project file relation, data relation within the project structure, tag association, messaging text to an HMI, scripting, merging of data to provide meaningful messages to devices, names, user-defined names, linkage between an identifier and an instruction, name changes, etc.

Moreover, the intelligent component 706 can facilitate utilizing a consumption of a material and the status of such material to an operator role and/or position. For example, the intelligent component 706 can infer the consumption of raw materials utilized in the production of a particular industrial automation process and/or system. Such inference can be based at least in part upon historic data related to the consumption of materials, status and/or supply of materials, etc. Moreover, such consumption and status of materials can be communicated to an operator and/or the role of an operator.

It is to be understood that the intelligent component 706 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 708 can provide various types of user interfaces to facilitate interaction between a user and any component coupled to the access component 702. As depicted, the presentation component 708 is a separate entity that can be utilized with the access component 702. However, it is to be appreciated that the presentation component 708 and/or similar view components can be incorporated into the access component 702 and/or a stand-alone unit. The presentation component 708 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the access component 702.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
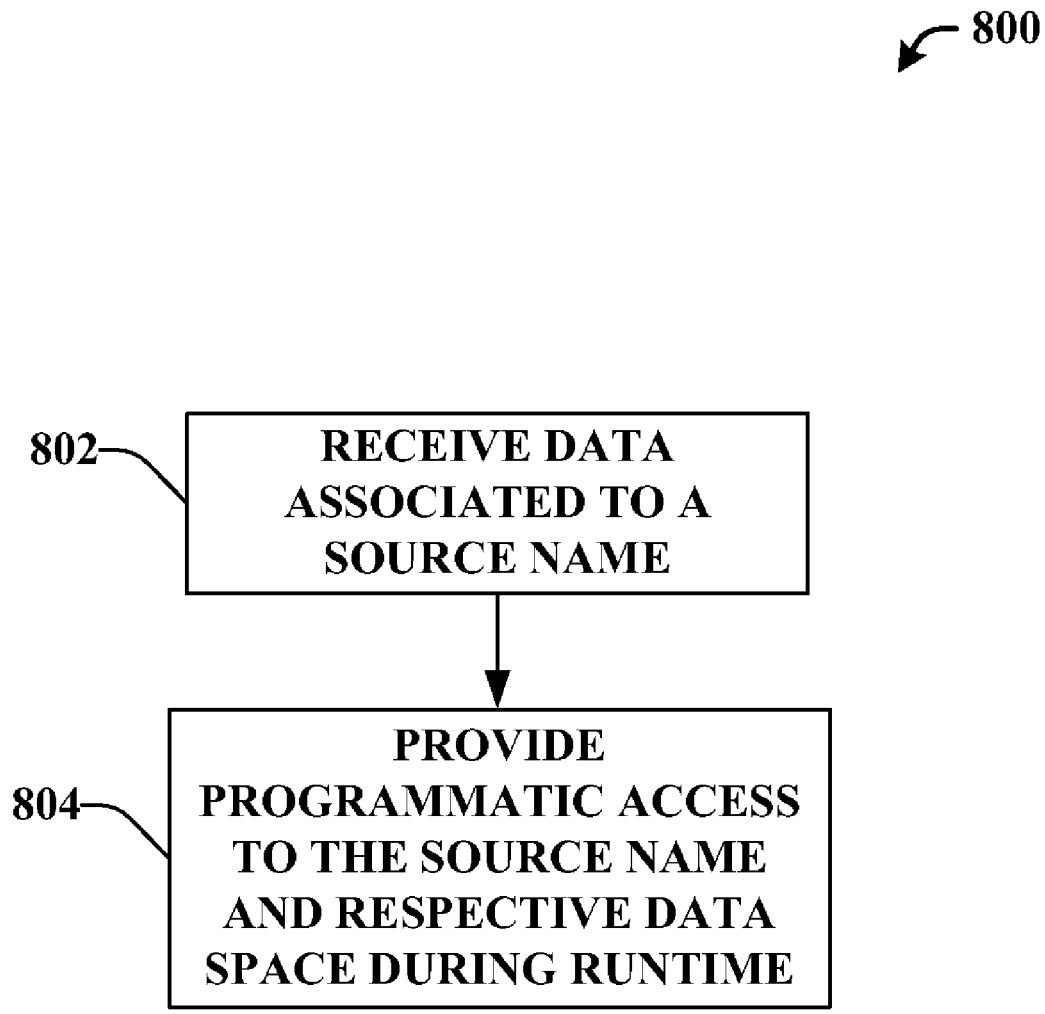
FIG. 8 illustrates an exemplary methodology for optimizing programming capabilities associated with names within a programmable logic controller.
Figure 9:
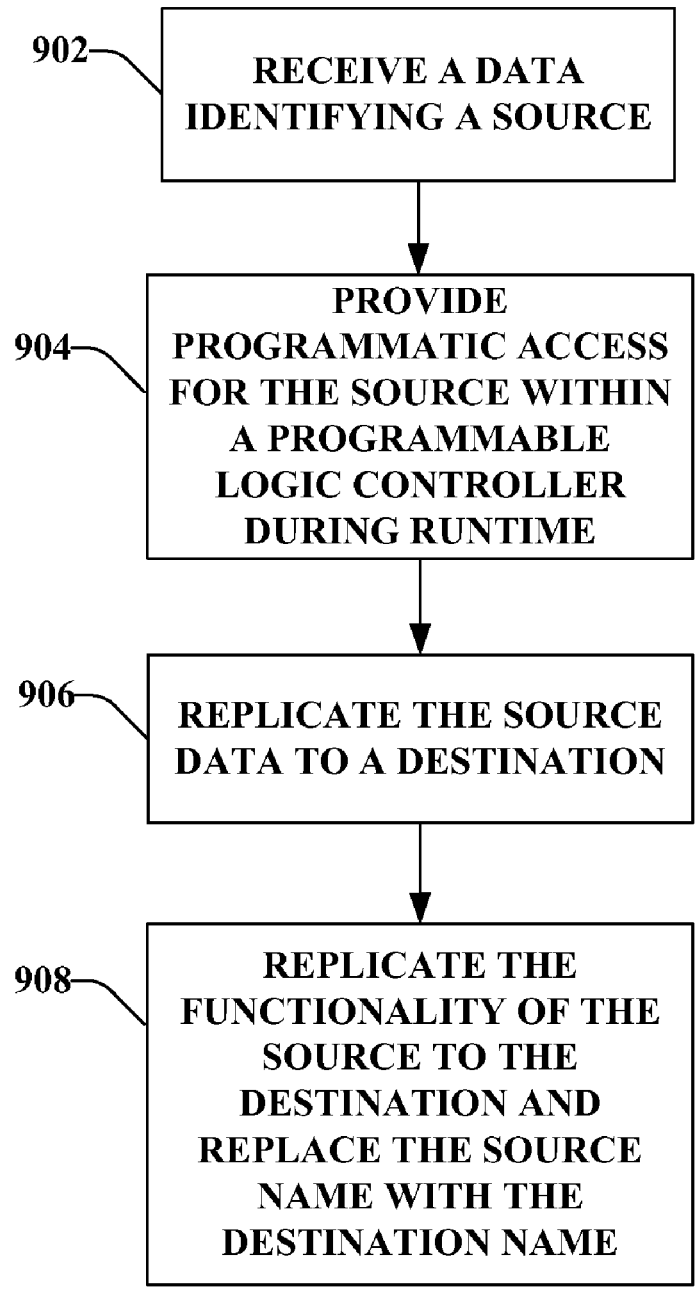
FIG. 9 illustrates an exemplary methodology that facilitates programmatically accessing a name within a programmable logic controller to implement data associated therewith throughout an environment.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 8, a methodology 800 is illustrated for optimizing programming capabilities associated with names within a programmable logic controller. At reference numeral 802, data associated to a source name can be received. The name can be associated with at least one of a task (e.g., executable fragments, etc.), a program (e.g., buckets of code, etc.), a routine (e.g. chunk of code, etc.), a controller, a component, a portion of code utilized by a controller, a module, an I/O module, a network, a drive, a motion axis, a drive, a trend, a structure, a tag, an object, a modular controller component, a device, and/or any suitable entity that can be utilized within an automation environment that includes a reference and/or a name stored in the PLC. Moreover, the source can be designated by a user to be a portion of data that can be replicated for implementation with a disparate name within a project structure.

At reference numeral 804, programmatic access to the source name and respective data space can be provided during runtime within a controller and/or a programmable logic controller (PLC). The programmatic access to the name and respective data space (the source) during runtime allows data space (e.g., and associated data) to be re-used based on the name referencing such space and data, wherein the re-use can be automatically tailored to a disparate name (destination) but utilizing the core functionality of the data space. Furthermore, the programmatic access can allow inheritance of names/data space/functionality, enhanced encapsulation, and can dramatically improve productivity to create portions of data and re-using such data within a project structure associated with an automation environment and/or a PLC.

It is to be appreciated that the data received can leverage the names that define a portion of project structure within the PLC for implementation upon disparate portions of data and/or project structure. Thus, the names and respective data space (and associated data) within the PLC can be copied and implemented throughout with the appropriate naming conventions without re-entry, or manual insertion. In other words, having the ability to programmatically access the names related to any suitable entity within an automation environment and/or PLC can be beneficial in creating portions of data (e.g., string of text utilized with an HMI, etc.) associated with such automation environment.

Thus, a user may want to program three conveyor devices (named conveyor1, conveyor2, and conveyor3) based on a portion of data that controls such devices, wherein such portion of data for conveyor1 is named "conveyor1." The user can retrieve data related to "conveyor1" (e.g., also referred to as the source) and replicate such data to program the disparate rollers at runtime by utilizing "conveyor1" data but automatically replacing such name (e.g., source name) with the respective names "conveyor2," and "conveyor3" throughout the entire portion of data employed. By allowing such programmatic access at runtime within the controller and/or PLC, programming for a plurality of entities within an industrial automation environment that utilize the substantially similar data can be optimized based on this re-use and automatic population/replacement of the appropriate names.

FIG. 9 illustrates a methodology 900 that facilitates programmatically accessing a name within a programmable logic controller to implement data associated therewith throughout an environment. At reference numeral 902, data identifying a source can be received. The source can relate to a name, wherein the name can be associated with at least one of a task (e.g., executable fragments, etc.), a program (e.g., buckets of code, etc.), a routine (e.g. chunk of code, etc.), a controller, a component, a portion of code utilized by a controller, a module, an I/O module, a network, a drive, a motion axis, a drive, a trend, a structure, a tag, an object, a modular controller component, a device, and/or any suitable entity that can be utilized within an automation environment that includes a reference and/or a name stored in the PLC. The data received can identify a source, wherein the source can be a portion of data that is to be replicated and/or re-used within a project structure. In one example, a user can utilize a generic specifier such as a "This" function that can retrieve portions of data related to the project structure, wherein such portions can be the source to be copied and/or replicated.

At reference numeral 904, programmatic access can be provided within a PLC for the source name (and respective data space including data related thereto) during runtime. Utilizing such runtime programmatic access, the source name and respective data space can be replicated and utilized to provide functionality to a portion of the project structure, wherein the source name can be automatically updated. At reference numeral 906, the source name and corresponding data can be replicated to a destination. The destination can be a disparate portion of project structure that corresponds to a disparate name (e.g., user-defined). For instance, an existing conveyor control portion of data for conveyor1 can be the source, while the user can create conveyor2, conveyor3, etc. as destinations with such user-defined names. At reference numeral 908, the functionality of the source can be replicated to the destination while replacing the source name with the destination name. Thus, the portion of data related to conveyor1 can be replicated and replaced with the destination name (e.g., conveyor2, conveyor3, etc.) throughout the entire portion of data related to conveyor1 and such data space.

Figure 10:
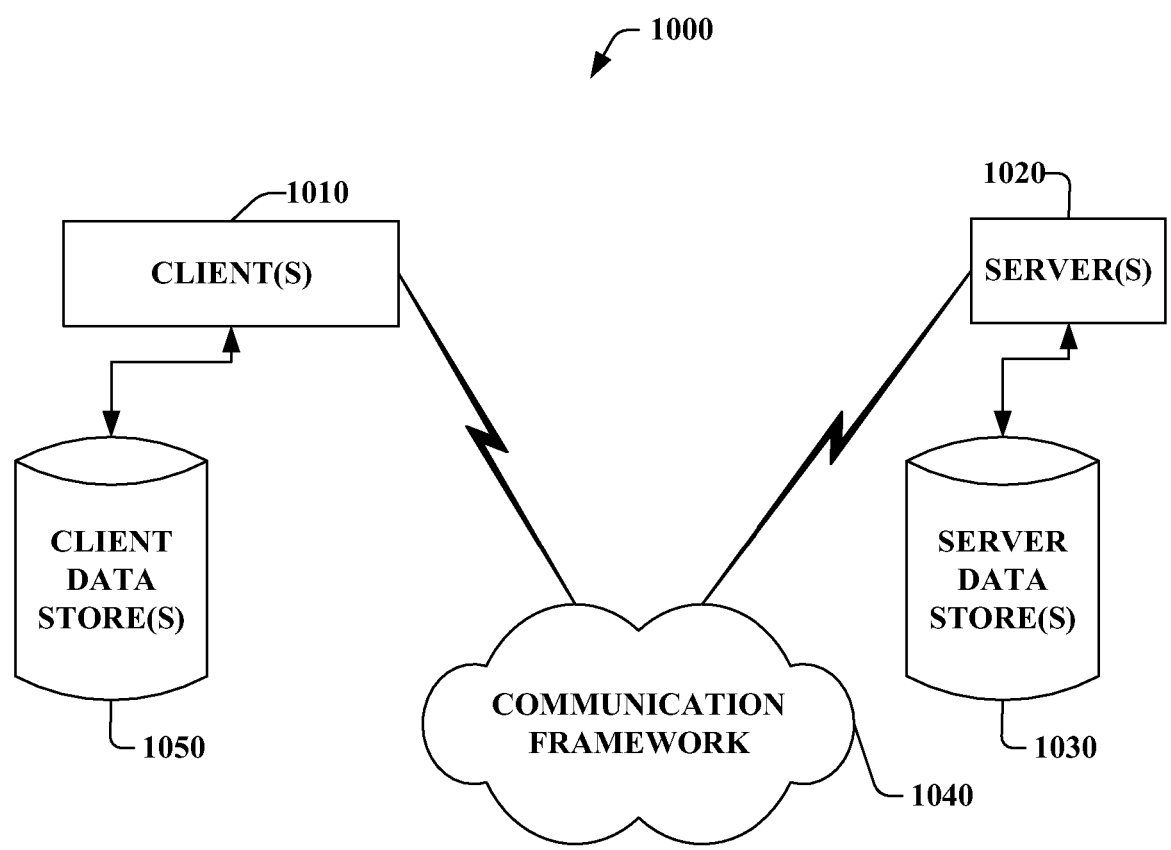
FIG. 10 illustrates an exemplary networking environment, wherein the novel aspects of the claimed subject matter can be employed.
Figure 11:
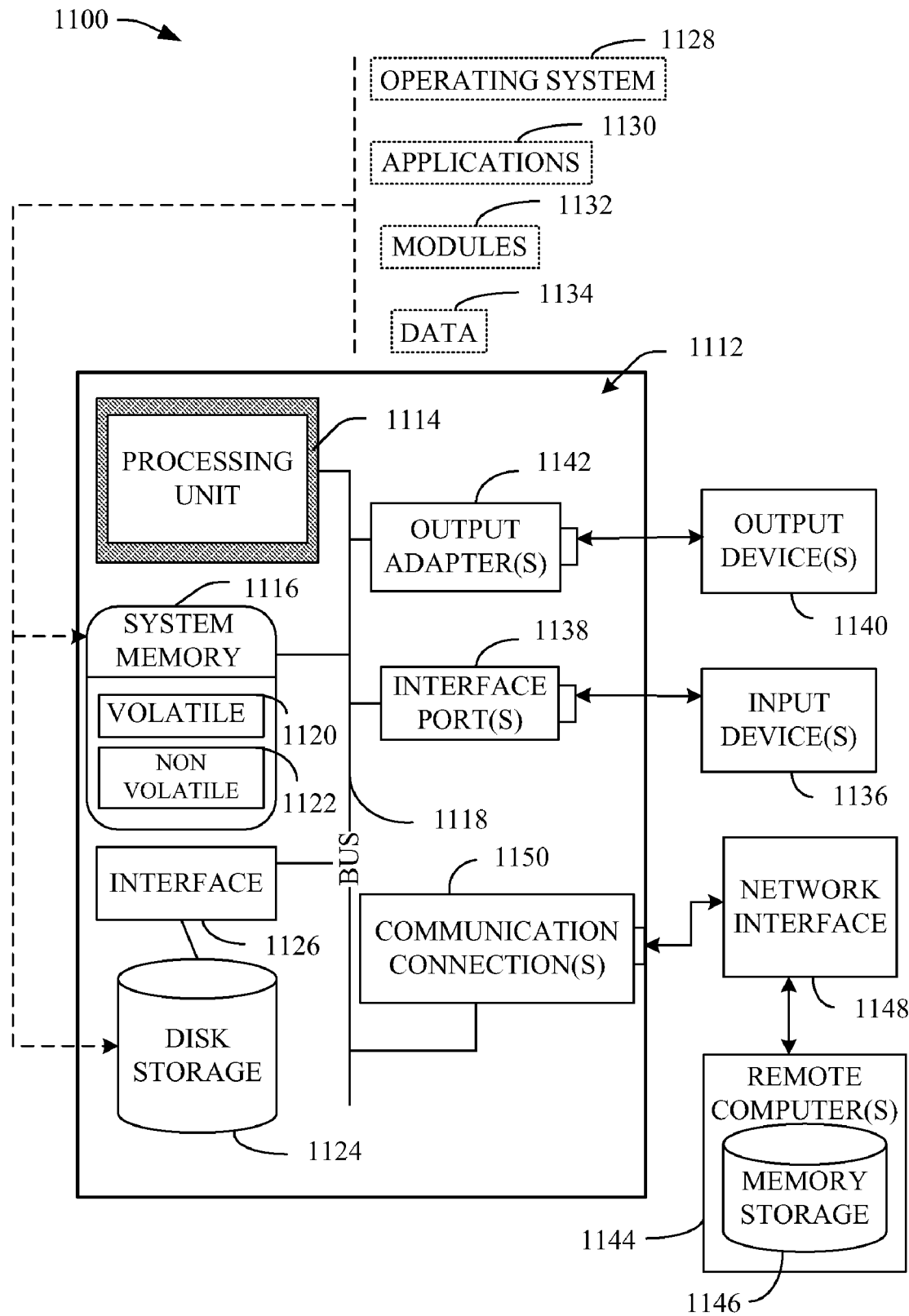
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
    a processor;
    a memory communicatively coupled to the processor, the memory having stored therein computer-executable instructions configured to implement the system, including:
    an interface component that facilitates receipt of a project file that includes at least a portion of code related to an object associated with a controller and a name associated with the portion of code, wherein the project file is stored in the controller, the portion of code and the name associated with the portion of code is stored in a data space of the controller; and
    an access component integrated within the controller and communicatively coupled to the interface component that accesses the name and respective data space, wherein the access component is employed for programming of the data space during runtime of the controller, wherein the programming causes the portion of code to be re-used by a disparate name referencing the same data space; and
    a programmed instruction within the controller utilizing a generic identifier and an object type during runtime of the controller to request the name or disparate name associated with a current context of execution of the portion of code, the object type identifies a type of the object from a plurality of types, the generic identifier is used for each type of the plurality of types, the generic identifier and object type are employed by the access component with execution context information associated with the data space to retrieve the name or disparate name associated with the current context of execution of the portion of code, the access component provides the name or disparate name to the programmed instruction.

2. The system of claim 1, wherein the name is associated with at least one of a task, a program, or a routine utilized by a controller, a module, an I/O module, a network, a drive, a motion axis, a drive, a trend, a structure, a tag, an object, a device; or a modular controller component.

3. The system of claim 2, the name is a string tag, wherein the string tag is at least one of a virtual input, a physical input, a virtual output, or a physical output related to the programmable logic controller, and the string tag is represented in at least one of a Latin based ASCII, a UNICODE format, or a format utilized in an Asian language.

4. The system of claim 3, further comprising an external device that utilizes such string tag, the external device is at least one of an HMI or an Information Technology database.

5. The system of claim 3, further comprising an external device that utilizes such string tag, the external device is at least one of a pusher, a computer, a disparate controller, a roller, a station, a welder, a scanner, a belt conveyor, a pump, a press, a fan, a spray, a conveyor, an entity controlled by the PLC, or a photo eye.

6. The system of claim 3, further comprising a disparate controller that utilizes such string tag.

7. The system of claim 1, the access component locates a source to replicate based on the received name; the source is identified by the name and respective data space.

8. The system of claim 7, the access component provides at least one of the following: a replication of code associated with the source to a destination that is a user-defined name; and an automatic replacement of the source name with the destination user-defined name throughout the entirety of code associated with the source name and respective data space.

9. The system of claim 1, further comprising a link component that links the code received to a hidden identifier to allow the code to stay linked to a source regardless of a change to the name linked to the source, the link component employs an inheritance technique utilizing a "This" function.

10. The system of claim 1, further comprising a script component that provides a message script with the name to communicate with an external device, the external device is at least one of an HMI, an Information Technology database, a disparate system, and a disparate controller.

11. The system of claim 1, further comprising a security component that provides authorization and data integrity during access of at least one name and respective data space.

12. The system of claim 1, further comprising a log component that tracks access of the name and respective data space related to programming the programmable logic controller.

13. The system of claim 1, further comprising a search component that facilitates querying data associated with the access component.

14. The system of claim 13, the data can be related to at least one of the following: a task, a program, a routine, a controller, a component, a portion of code utilized by a controller, a module, an I/O module, a network, a drive, a motion axis, a drive, a trend, a structure, a tag, an object, a device; and a modular controller component.

15. The system of claim 1, further comprising a bridge component that provides a first network protocol utilized to carry data from the programmable logic controller and configures the data for transmittal over a second network protocol.

16. The system of claim 15, the bridge component bridges multiple communication networks.

17. The system of claim 15, the first network protocol is one of Fieldbus, Profibus, Hart, Modbus, ASI-bus, and Foundation Fieldbus.

18. The system of claim 17, the second network protocol is Common Industrial Protocol (CIP).

19. The system of claim 1, further comprising a log component that tracks changes to the name and disparate name during runtime execution, the programmed instruction retrieves the changed name or changed disparate name associated with the current context of execution of the portion of code.

20. The system of claim 1, wherein the programmed instruction is part of the portion of code.

21. The system of claim 1, wherein the programmed instruction is part of industrial application code.

22. A method comprising:
employing a processor executing computer executable instructions stored on a computer-readable storage medium to implement the following acts:
receiving a project file that includes at least a portion of code related to an object associated with a controller and a name associated with the portion of code;
storing the project file in the controller, the portion of code and the name associated with the portion of code is stored in a data space of the controller;
programming the data space during runtime of the controller, wherein the programming causes the portion of code to be re-used by a disparate name referencing the same data space; and
programmatically requesting the name or disparate name associated with a current context of execution of the portion of code by utilizing a generic identifier and an object type during runtime of the controller, the object type identifies a type of the object from a plurality of types, the generic identifier is used for each type of the plurality of types, the generic identifier and object type are employed with execution context information associated with the data space to retrieve the name or disparate name associated with the current context of execution of the portion of code.

23. The method of claim 22, wherein the name is associated with an entity that is at least one of a task, a program, a routine, a controller, a component, a portion of code utilized by a controller, a module, an I/O module, a network, a drive, a motion axis, a drive, a trend, a structure, a tag, an object, a device; or a modular controller component.

24. The method of claim 23, wherein the assigned name is a string tag that is at least one of a virtual input, a physical input, a virtual output, or a physical output related to the programmable logic controller, and the string tag is represented in at least one of a Latin based ASCII, a UNICODE format, or a format utilized in an Asian language.

25. The method of claim 24, further comprising utilizing the string tag by an external device that is at least one of an HMI, an Information Technology database, a disparate system, or a disparate controller.

26. The method of claim 22, further comprising tracking changes to the name and disparate name during runtime execution, the programmatic request retrieves the changed name or changed disparate name associated with the current context of execution of the portion of code.

27. The method of claim 22, wherein the programmed instruction is part of industrial application code that is part of the portion of code.

28. A system comprising:
means for receiving project file that includes at least a portion of code related to an object associated with a controller and a name associated with the portion of code;
means for storing the project file in the controller, the portion of code and the name associated with the portion of code data is stored in a data space of the controller; and
means for programming the data space during runtime of the controller, wherein the programming causes the portion of code to be re-used by a disparate name referencing the same data space; and means for programmatically requesting the name or disparate name associated with a current context of execution of the portion of code by utilizing a generic identifier and an object type during runtime of the controller, the object type identifies a type of the object from a plurality of types, the generic identifier is used for each type of the plurality of types, the generic identifier and object type are employed with execution context information associated with the data space to retrieve the name or disparate name associated with the current context of execution of the portion of code.

* * * * *